Patented Mar. 1, 1932

1,847,539

UNITED STATES PATENT OFFICE

ALVAH H. SABIN, OF FLUSHING, NEW YORK, ASSIGNOR, BY MESNE ASSIGNMENTS, TO TITANIUM PIGMENT COMPANY, INC., OF NEW YORK, N. Y., A CORPORATION OF MAINE

PAINT

No Drawing. Application filed October 9, 1926, Serial No. 140,691. Renewed June 30, 1931.

The particular object is to produce a satisfactory titanium oxide paint capable of application by brushing and possessing greater durability than hitherto attained with this material. Titanium oxide furnishes a white pigment of greater opacity and hiding power probably than any other known white pigment but has not been available for general paint use because it does not combine with drying oils, like other pigments, to produce a surface sufficiently hard to be durable; additions to it of hardening agents, such as work well with other pigments, are apparently without effect to cure the disability referred to with the result that it is customary, when titanium pigment is used at all, to mix it with other pigments, such as zinc oxide in proportions large enough to give the required durability but this introduces other qualities which for many uses are objectionable. This invention provides a titanium paint which in every mechanical sense is much the same as ordinary zinc or lead paint but possesses, in maximum degree, the remarkable hiding power and resistance to chemical action incident to the presence of the titanium oxide therein.

This result is accomplished in accordance with this invention by the combination of a portion of cellulose nitrate with the titanium pigment and the oil vehicle, a specific example of the invention being as follows:

Make a paste of

| | Gal. |
|---|---|
| Dry titanium pigment powder (4 lbs.) | .11 |
| Raw linseed oil | .15 |

Mix this paste gradually into a

| | |
|---|---|
| Cellulose nitrate solution | .24 |

(Such solution comprising

| | |
|---|---|
| Cellulose nitrate | 35-40 oz. |
| Butyl acetate or other solvent | 1 gal.) |

To this mixture add more vehicle oil, such as linseed, containing any usual drier until the desired brushing consistency is reached, say .45

Liquid drier .07

The titanium pigment, above referred to, may be the commercial titanium oxide pigment, such as is obtainable in the trade as titanox and such as is identified by the United States Standard Formulæ as comprising about 25% titanium oxide precipitated upon and coalesced with about 75% of barium sulphate but these relative proportions are not important to the present invention so long as a sufficient amount of titanium oxide is present to give the hiding power sought, the barium sulphate in this commercial pigment being in the nature of an extending agent which reduces the cost without impairing the effect. Instead of linseed oil any other commonly accepted equivalent drying oil may be used. It is best to grind the pigment with the oil and produce the paste or a stiff mixture in this way. The cellulose solution is prepared by dissolving cellulose nitrate in any appropriate volatile solvent usual for that purpose, such, for example, as amyl or butyl acetate, the strength of this solution being about as above indicated. The making of this solution requires preliminary treatment of the cellulose nitrate, making what is known as low viscosity pyroxylin and can be obtained in the trade already mixed. When this ready mixed solution is used, it is reduced in consistency by the addition of a solvent, such as amyl or butyl acetate, to about the extent already described.

The relative proportions in the specific formula above given are obviously subject to the customary variation. Variation of the proportion of cellulose nitrate entering into the composition will correspondingly vary the hardness of the resulting paint film and it is obvious that variation of the oil, which is added to the mixture of paste and cellulose will vary the consistency of the composition as a whole; the amount of drier used of course depending on circumstances. Other ingredients may be added to the mixture and except insofar as they neutralize the combination of hiding and hardening effects, or are objectionable for other reasons, are to be understood as included generally within this invention. It is important to mix the pigment-oil mixture or paste gradually into the nitrocellulose solution before adding the bulk of the oil, because otherwise the effect is to precipitate the nitrocellulose as a body. It is well known that nitrocellulose is not soluble in drying oils. In my composition the nitrocellulose appears to be in colloidal suspension or dispersion in the oil vehicle. Except for this precaution, the several ingredients may be combined in any appropriate manner within the scope of this invention. The paint can be packaged and shipped in the form of the mixture of paste and cellulose nitrate in which case the oil and drier will be later added to it, or it can be packaged as a ready-mixed paint with the proper amount of oil added to the paste and cellulose in the first instance.

Claims:

1. In the manufacture of oil paints, the process which comprises intimately mixing together an oil paste containing titanium oxid and a quantity of nitrocellulose solution, and thereafter gradually mixing in an oil vehicle, under conditions such that no precipitation of the said nitrocellulose as a body takes place.

2. An oil vehicle paint comprising titanium oxid, a drying oil and nitrocellulose; the said nitrocellulose being present in smaller amounts than the said drying oil.

3. An oil vehicle paint comprising titanium oxid and a drying oil and also containing dispersed nitrocellulose.

4. An oil vehicle paint comprising titanium oxid, barium sulfate, a drying oil and nitrocellulose, the said nitrocellulose being present in smaller amounts than the said drying oil.

In testimony whereof, I have signed this specification.

ALVAH H. SABIN.